United States Patent [19]

Lipton et al.

[11] Patent Number: 4,523,226
[45] Date of Patent: Jun. 11, 1985

[54] STEREOSCOPIC TELEVISION SYSTEM

[75] Inventors: Lenny Lipton, Pt. Richmond; Michael R. Starks, Fairfax; James D. Stewart, Oakland; Lawrence D. Meyer, Ross, all of Calif.

[73] Assignee: Stereographics Corporation, San Rafael, Calif.

[21] Appl. No.: 459,174

[22] Filed: Jan. 19, 1983

Related U.S. Application Data

[63] Continuation-in-part of Ser. No. 343,124, Jan. 27, 1982, abandoned.

[51] Int. Cl.³ .............................................. H04N 9/54
[52] U.S. Cl. ...................................... 358/88; 358/91; 358/92
[58] Field of Search ...................... 358/88, 91, 92, 97, 358/146, 237, 238, 239, 901; 352/60

[56] References Cited

U.S. PATENT DOCUMENTS

| | | | |
|---|---|---|---|
| 2,099,694 | 11/1937 | Land | 352/60 |
| 2,729,138 | 1/1956 | Bernier | 352/60 |
| 3,020,341 | 2/1962 | Owens | 358/92 |
| 3,114,002 | 12/1963 | Siepmann et al. | 358/97 |
| 3,251,933 | 5/1966 | Beste | 358/92 |
| 3,473,872 | 10/1969 | Okamura | 358/88 |
| 3,626,404 | 12/1971 | Ophir | 358/88 |
| 3,670,097 | 6/1972 | Jones | 358/91 |
| 3,674,921 | 7/1972 | Goldsmith | 358/91 |
| 3,688,045 | 8/1972 | Ohkoshi | 358/91 |
| 3,818,125 | 6/1974 | Butterfield | 358/92 |
| 4,152,724 | 5/1979 | Hunter | 358/901 |

FOREIGN PATENT DOCUMENTS 314046 7/1956 Switzerland .................. 352/60

OTHER PUBLICATIONS

Masters–Generating a 3D-TV Signal With One TV Camera–IBM Tech. Disclosure Bulletin, vol. 8 #1 Jun. 1965, p. 134.
Kennedy–Weather Satellite Picture Processor–Wireless World, May 1980–vol. 86, No. 1533, pp. 41–46.
Norling–the Stereoscopic Art–A Reprint–Jour. of Smpte–vol. 60, #53, pp. 268–307.

Primary Examiner—Joseph A. Orsino, Jr.
Attorney, Agent, or Firm—J. William Wigert, Jr.

[57] ABSTRACT

An improved stereoscopic television system is disclosed, having a great deal of compatibility with the existing commercial television infrastructure. Flicker is eliminated while preserving the existing bandwidth allowing the stereoscopic video signals to be handled with conventional apparatus such as video tape recorders, video disks, or broadcast equipment. In the present invention the number of fields per second is twice that of he standard field rate. When displayed on an unmodified receiver or monitor, each subfield image appears to be anamorphically compressed in the vertical direction by a factor of two. A blanking area and/or vertical sync pulse separates the two subfields.

42 Claims, 25 Drawing Figures

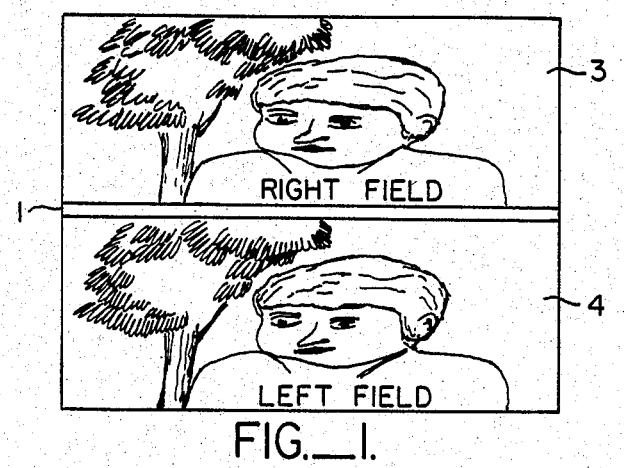
FIG._1.
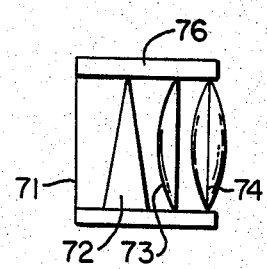
FIG._12B.
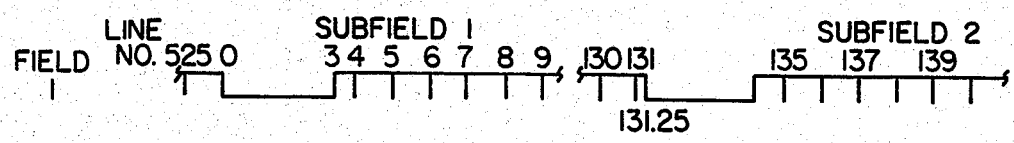
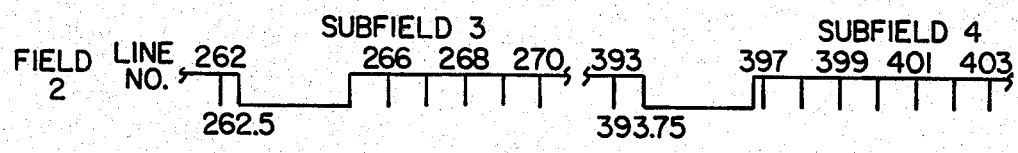
FIG._3C.
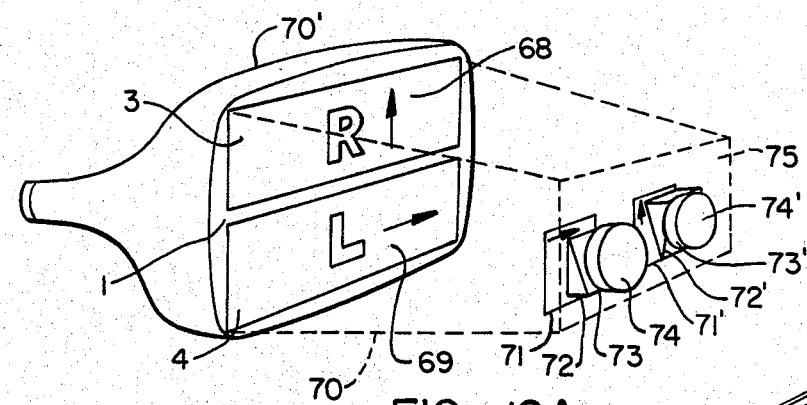
FIG._12A.
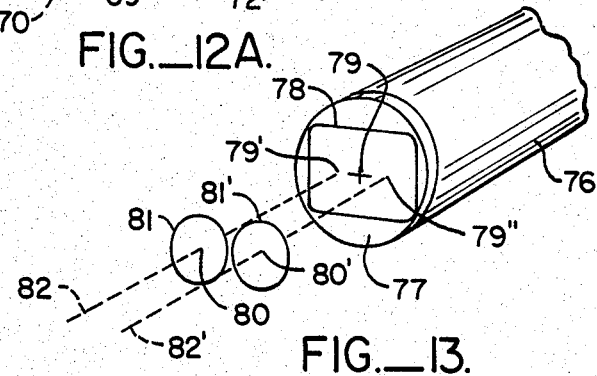
FIG._13.

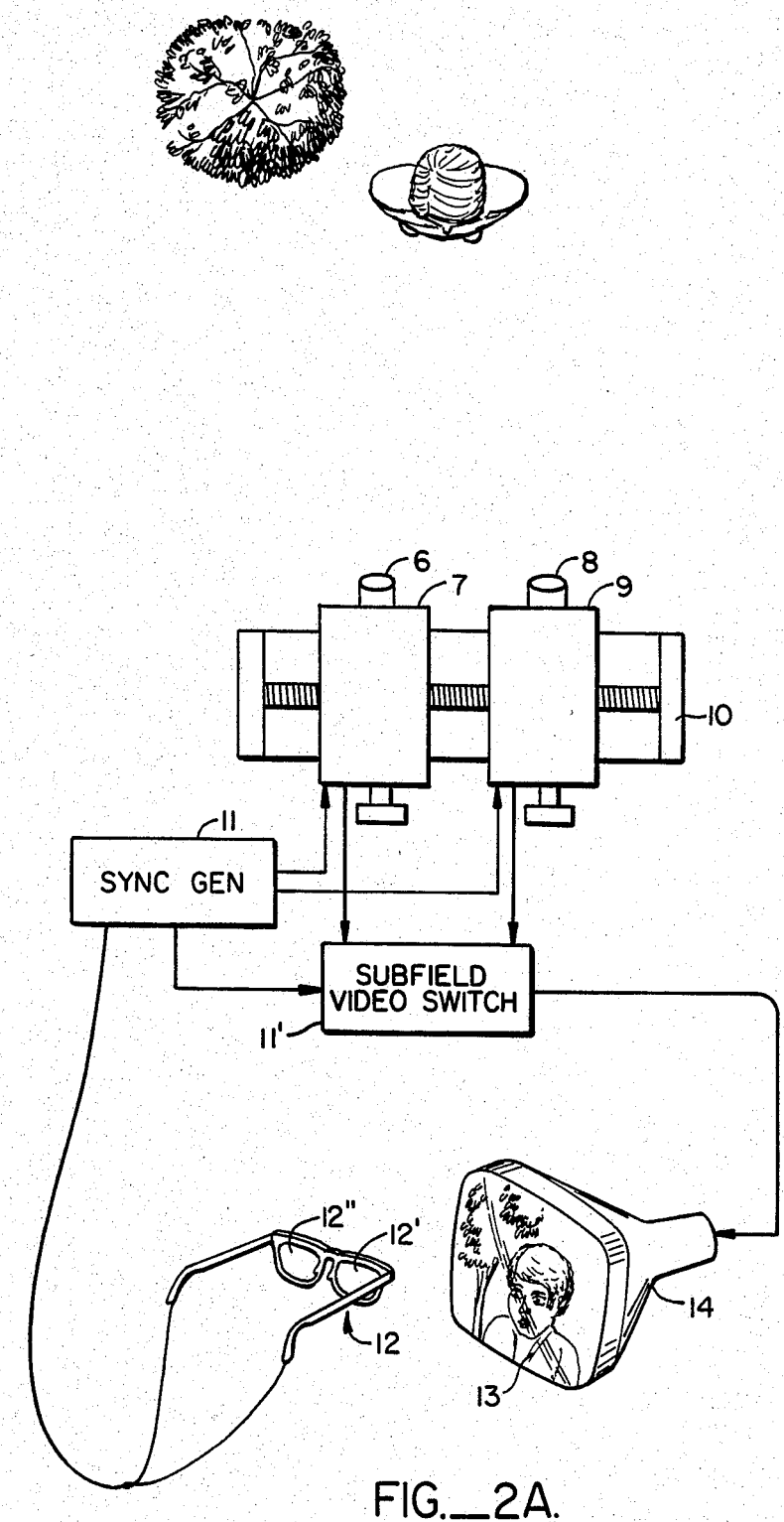
FIG._2A.

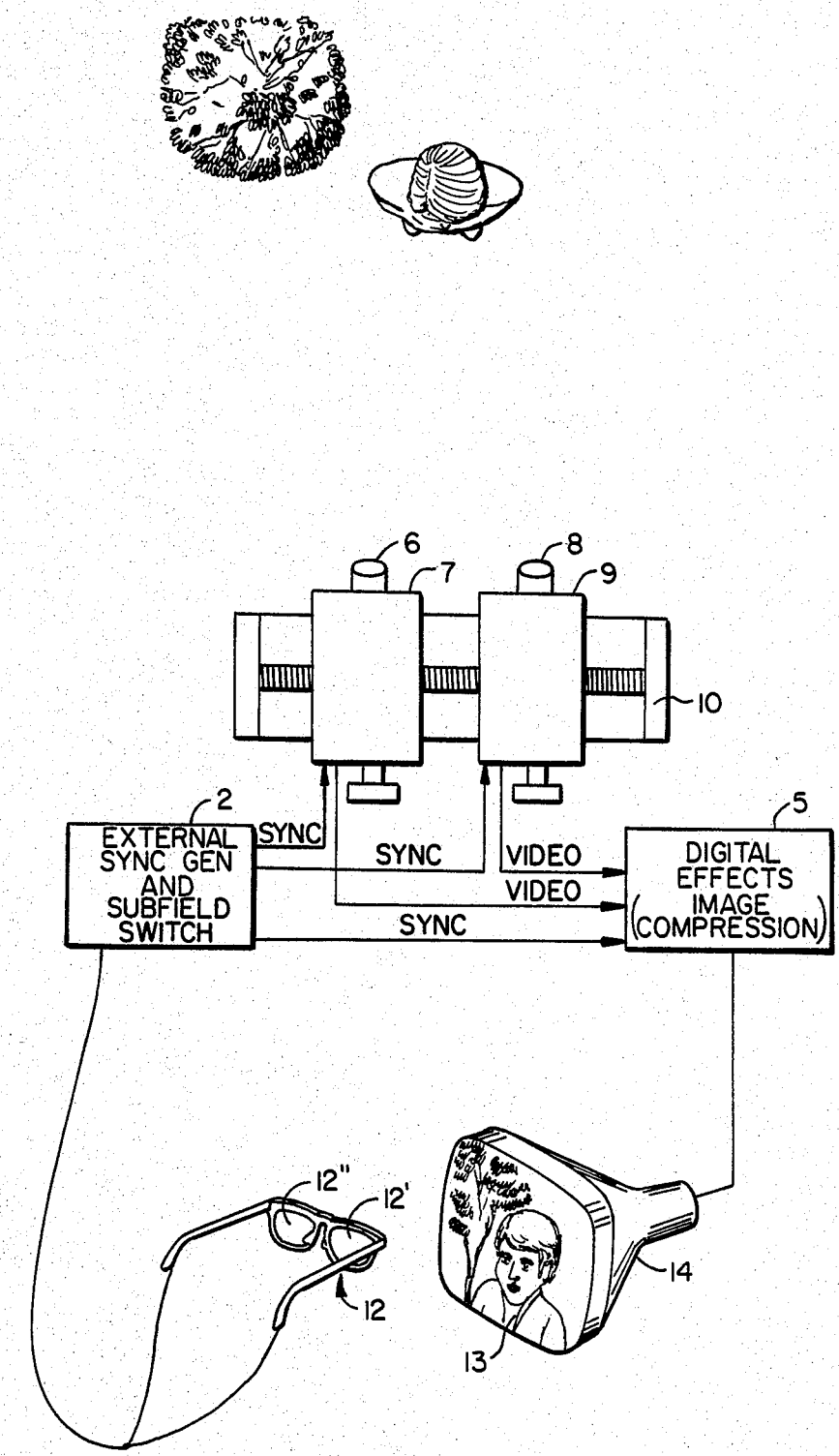
FIG._2B.

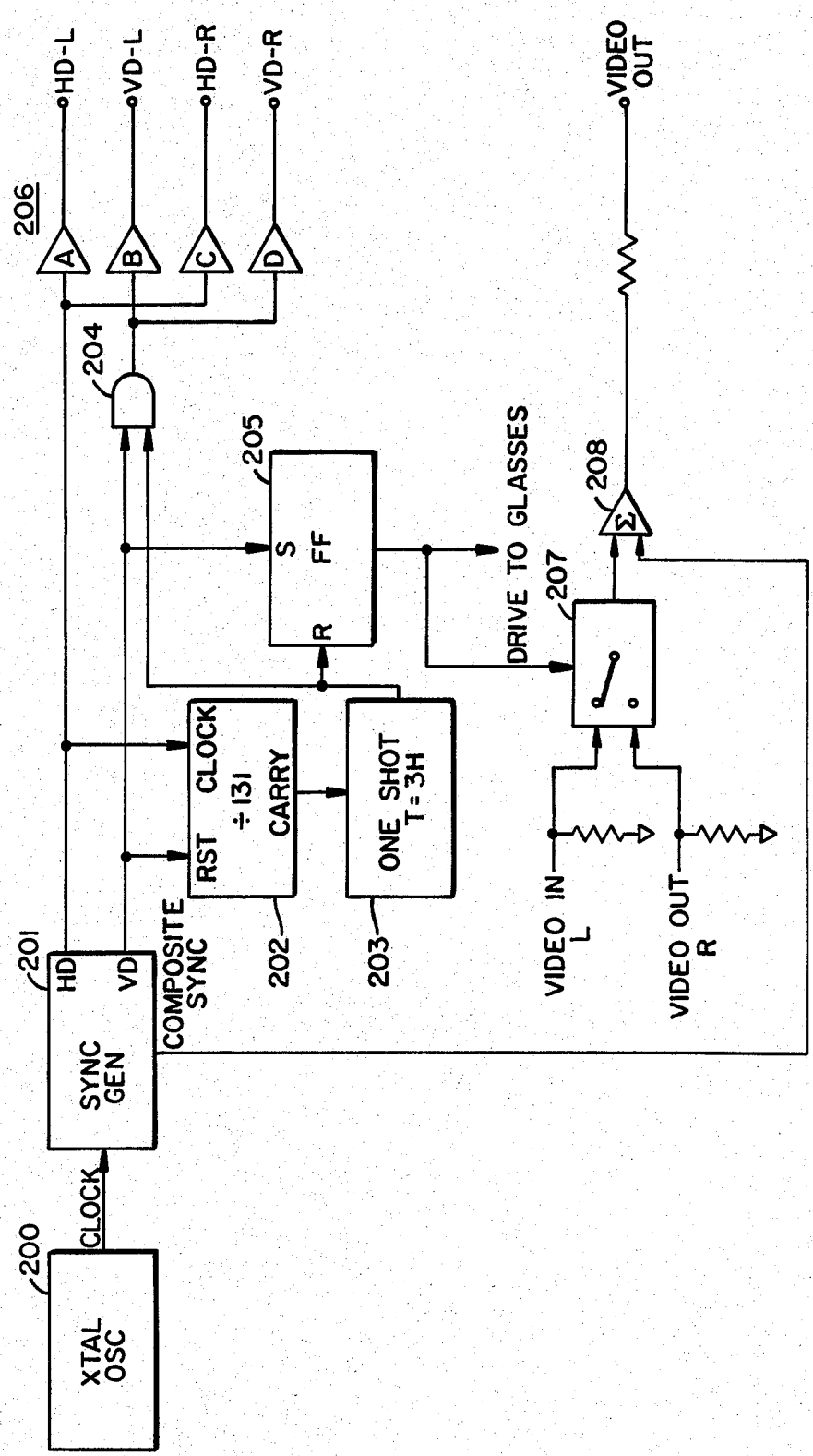
FIG._2C.

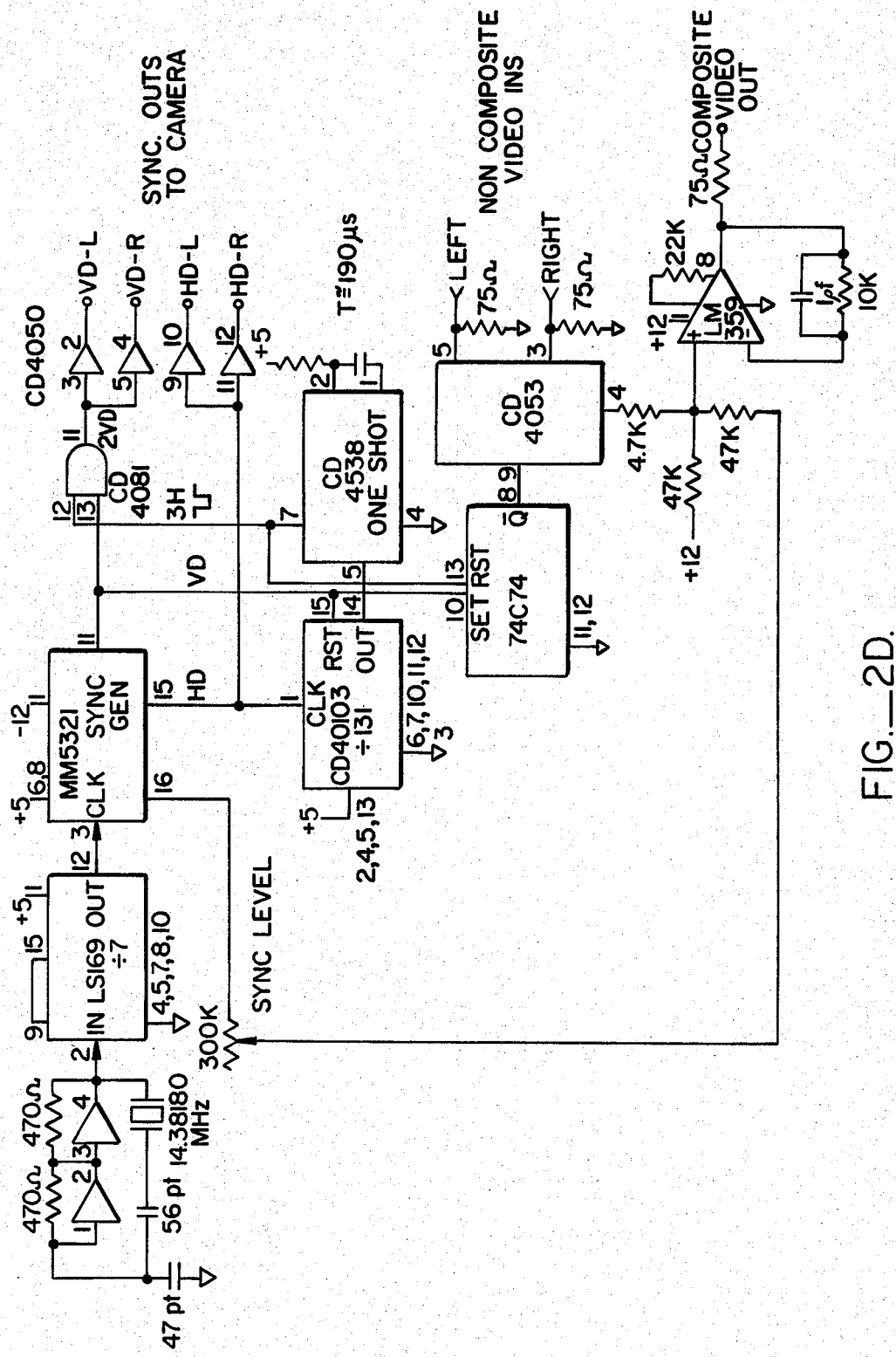
FIG._2D.

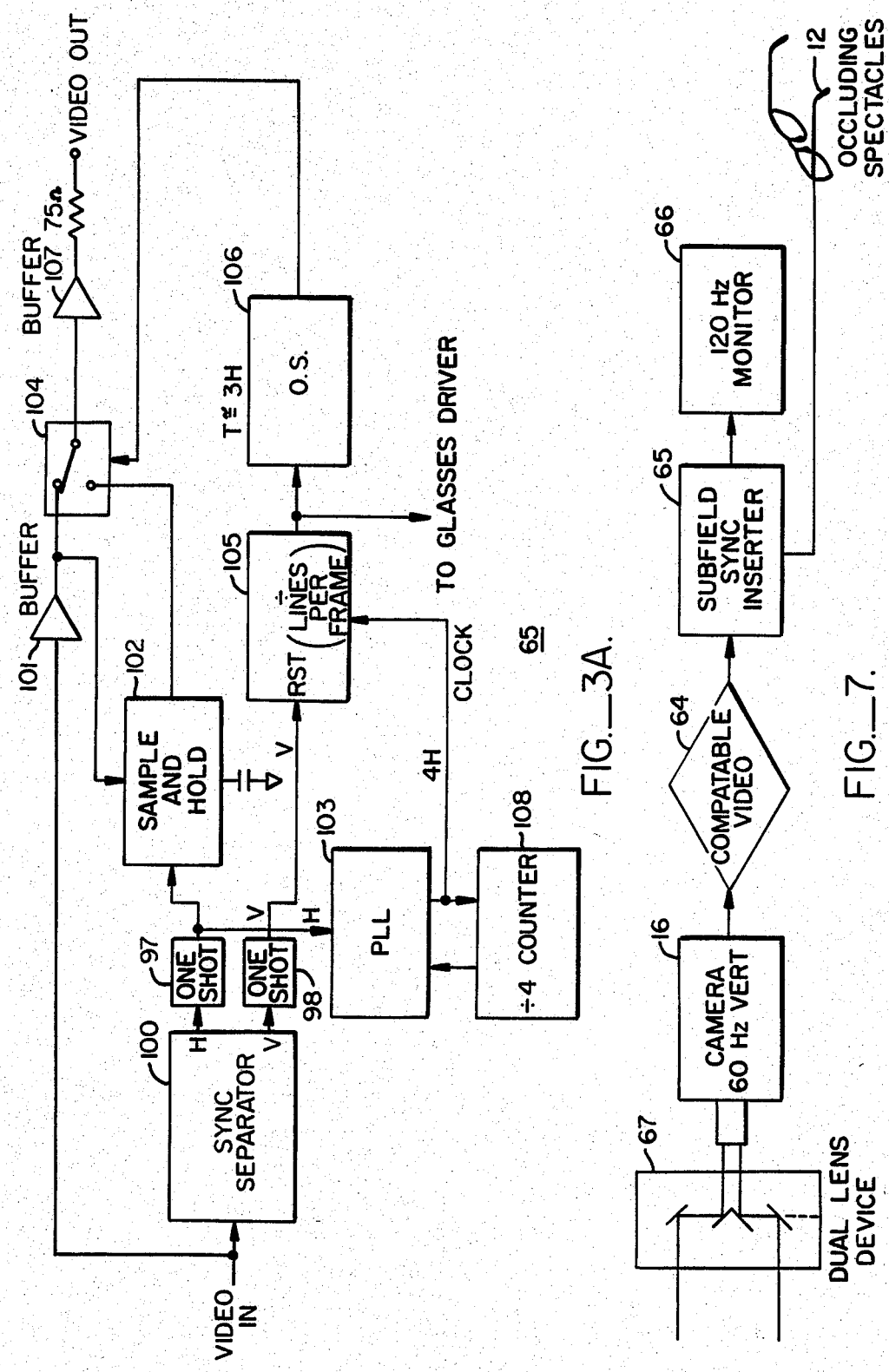

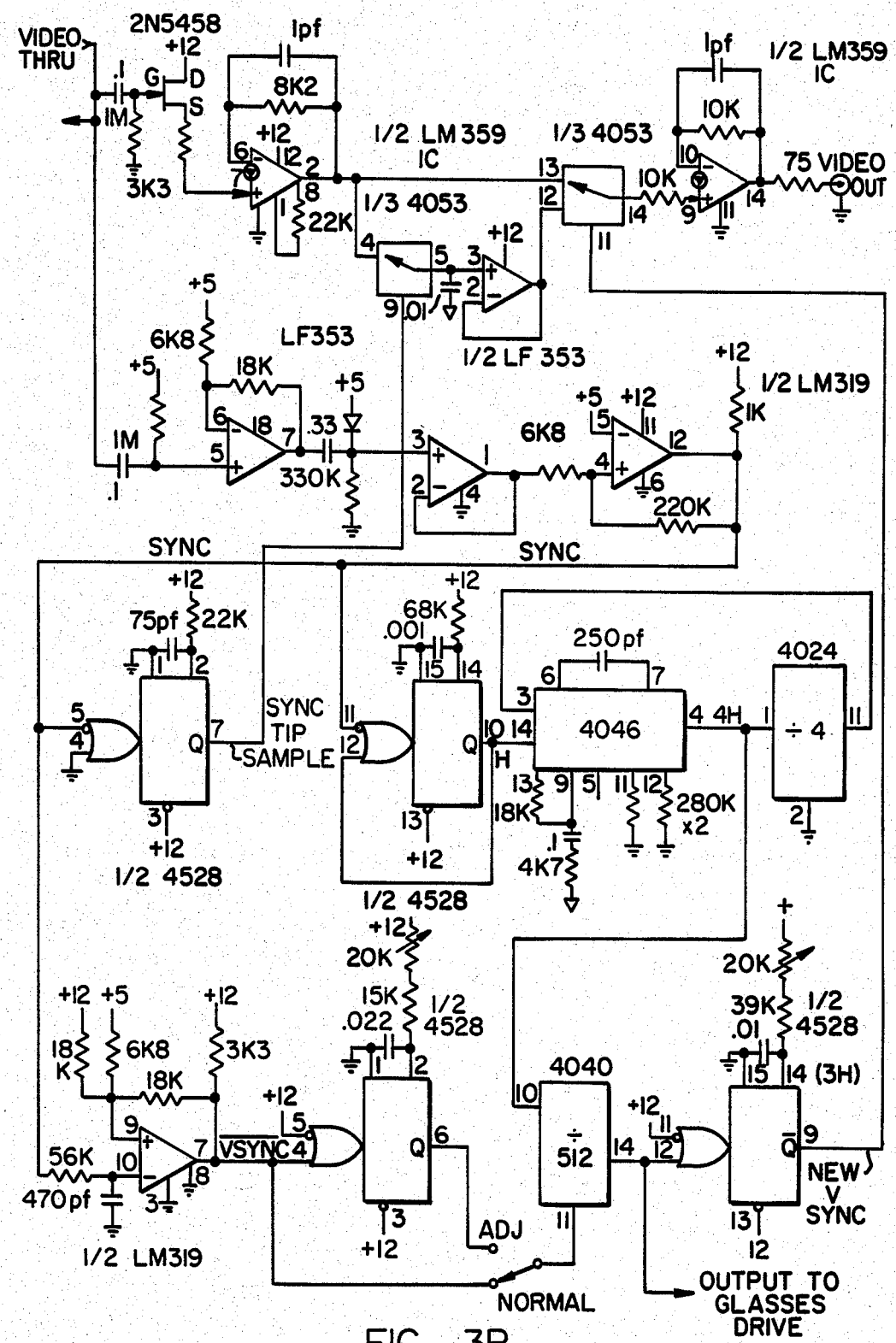
FIG._3B.

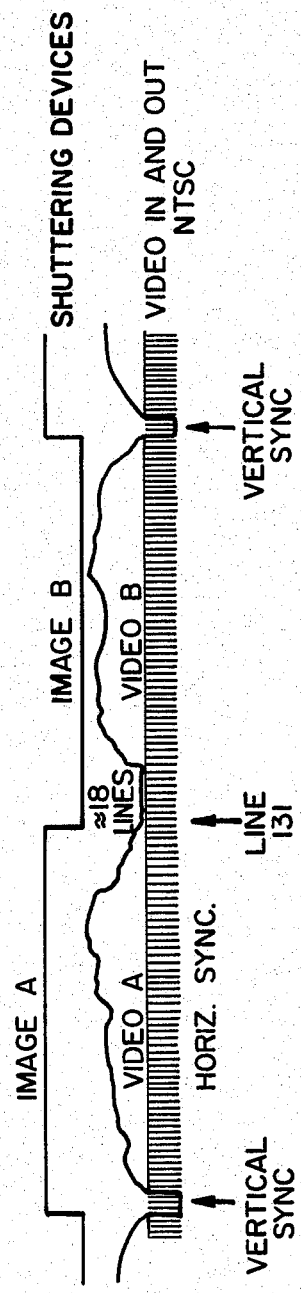
FIG._3D.
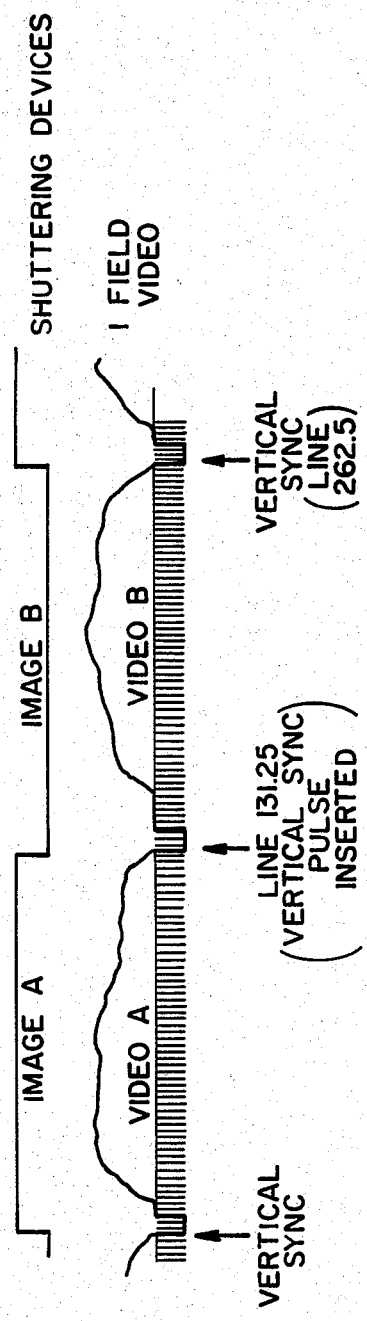
FIG._3E.

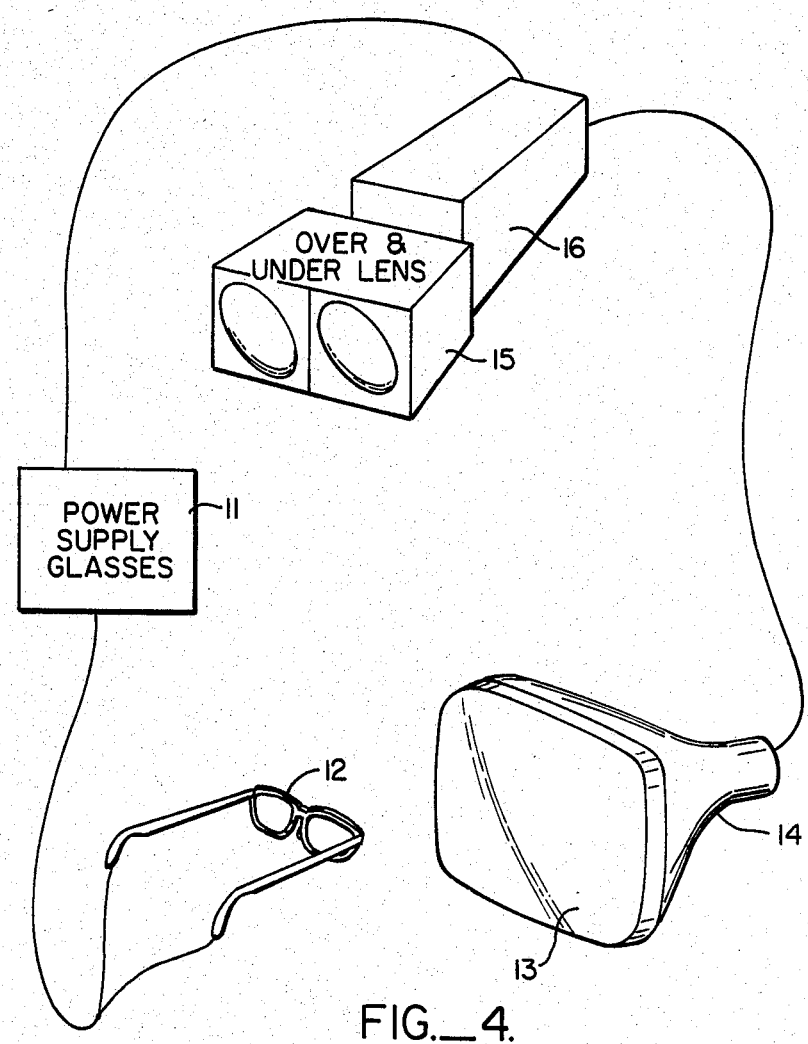
FIG._4.
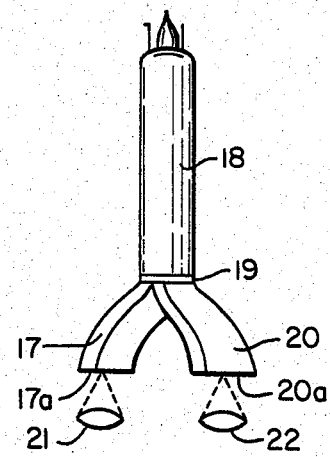
FIG._5.

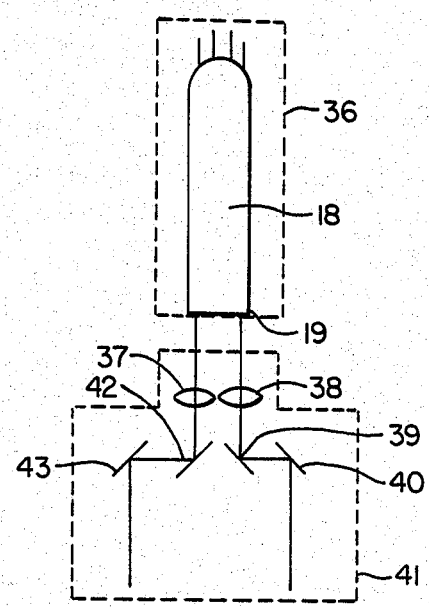
FIG._6A.
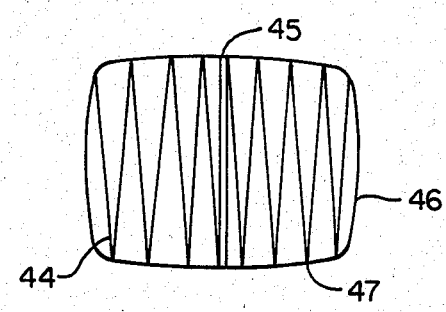
FIG._6B.
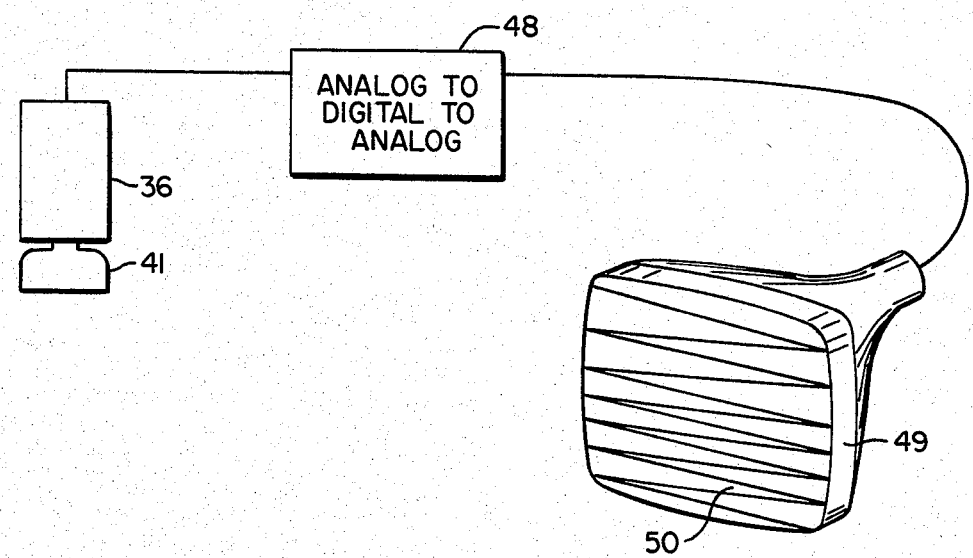
FIG._6C.

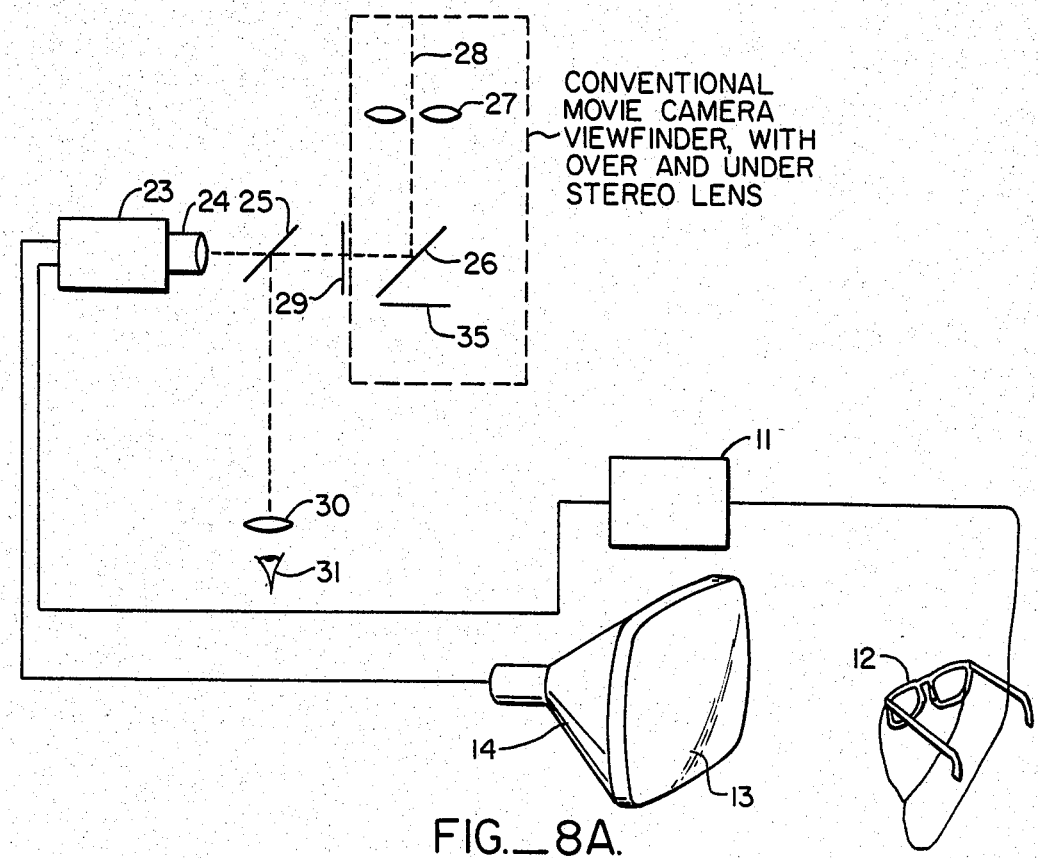
FIG._8A.
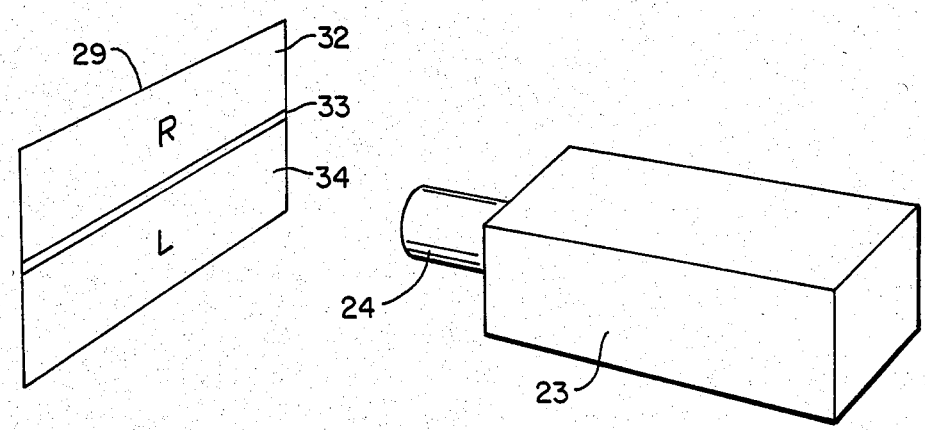
FIG._8B.

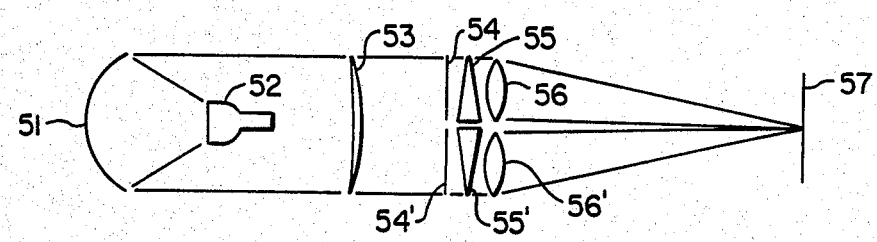
FIG._9A.
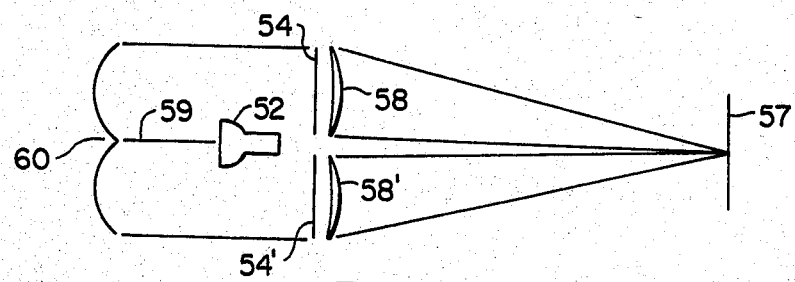
FIG._9B.
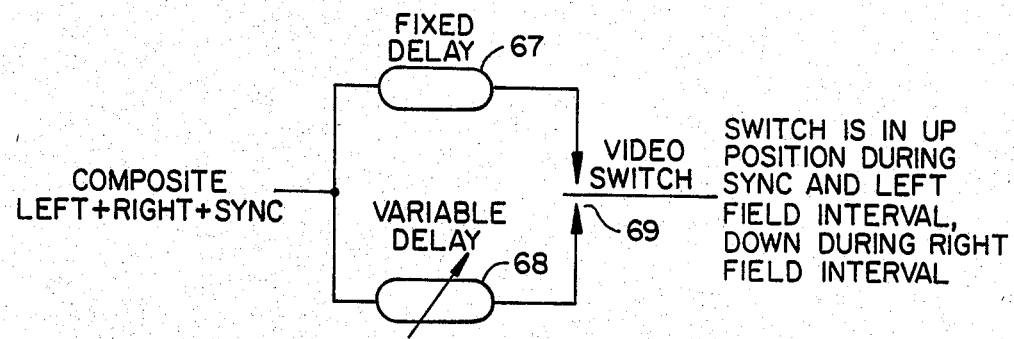
FIG._10.
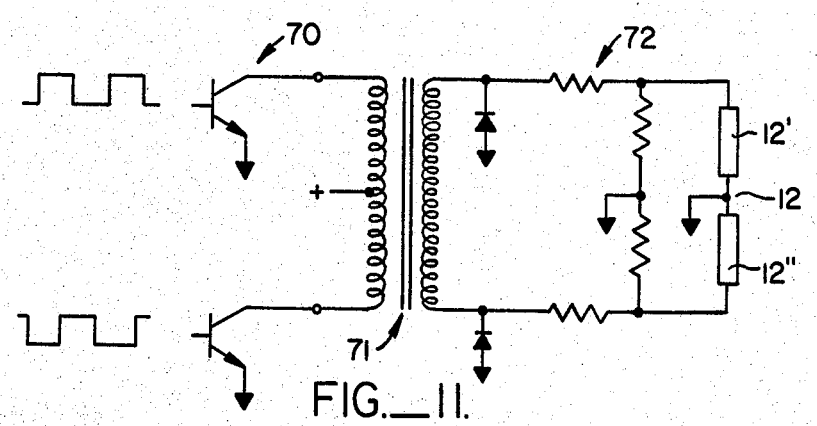
FIG._11.

STEREOSCOPIC TELEVISION SYSTEM

This is a continuation-in-part of U.S. patent application Ser. No. 343,124 filed Jan. 27, 1982 now abandoned.

DESCRIPTION

1. Technical Field

This invention provides a new stereoscopic imaging system. Specifically, an improved stereoscopic television system is disclosed, having a great deal of compatability with the existing commercial television infrastructure. Compared with the prior art employing sequential presentation of right-left images, in what is sometimes called the eclipse or occlusion system, we have eliminated flicker whilst preserving the existing bandwidth allowing our stereoscopic video signals to be handled with conventional apparatus such as video tape recorders, video discs, or broadcast equipment.

In particular, this disclosure reveals techniques for eliminating the storage techniques at the receiver called for in copending U.S. patent application Ser. No. 263,944.

2. Background Art

Present systems using alternate field encoding with individual occluding selection devices is hampered primarily by severe image flicker. Bandwidth restriction prevent doubling the number of fields needed by each eye for good image quality. A full discussion of the subject is given in FOUNDATIONS OF THE STEREOSCOPIC CINEMA (Lipton, Van Nostrand Reinhold, N.Y., June, 1982), and in copending U.S. patent application Ser. No. 263,944.

SUMMARY OF THE INVENTION

The present invention is based upon prior art employing switching techniques for displaying sequentially presented right and left image pairs, with certain important and unique differences. In the usual technique put into practice by Megatek, Panasonic (Matshushita) and Honeywell, video fields are alternately encoded with right or left information resulting in a reduction of fields which reach each eye to half the usual field rate. This results in intolerable flicker. In the present invention the number of fields per second is doubled by various means. In one technique we double the vertical scanning rate, thereby producing 120 fields instead of 60 fields per second. Thus the number of fields is doubled whilst the number of lines per field is halved.

When displayed on a usual receiver or monitor, each image will appear to be anamorphically compressed in the vertical direction by a factor of two. Two such images, the right and left fields, above and below, will be seen on the unmodified monitor. In the preferred embodiment a vertical sync pulse signal is added to a blanking area between the two subfields. These left and right fields, in this format, shall be referred to herein as left and right subfields. A sync pulse signal is added between the upper and lower images, or only a blanking area is provided, with no vertical sync signal between the two subfields. When displayed on a suitably modified monitor the two images are displayed in sequence. The monitor must also have the vertical controlling picture circuit adjusted to double deflection, e.g., double vertical sync frequency in order to display an image of proper proportions. An electronically unmodified monitor or receiver may be adapted for three-dimensional viewing with a stereoscope hood disclosed herein. Projection of stereoscopic images are also possible using apparatus disclosed herein.

The camera may take the form of a single camera with an image forming system capable of producing the two perspective viewpoints imaged above and below as shown in FIG. 1. By simply adding the appropriate sub-field blanking area and/or vertical pulse between the two images so formed by such optics, the electronic requirements for display are fulfilled.

On the other hand, the image source may be a two camera ensemble mounted on a single base or on separate bases, so adjusted to produce the necessary stereoscopic pair of images. These cameras are then adjusted to produce 131.25 line resolution images each, with fields externally or internally synchronized by a sync generator producing 120 Hz vertical drive pulses.

Thus, in the time that a single planar image made up of two 262.5 line fields would be produced, these two cameras produce four 131.25 lines per field. Therefore, 120 fields are produced in a second, half of them for the right perspective viewpoint and half for the left. These fields are then transmitted and received in the following manner: right-left-right-left. This sequence of four fields constitutes one stereoscopic image unit or image pair. These fields may also be presented in the following manner: right—right—left—left, as described in copending U.S. patent application Ser. No. 263,944.

Note that the bandwidth requirement remains the same for our system as for the television system commercially employed. Thus transmission of such a signal by closed circuit, through the air broadcast, or via cable may also be achieved. Moreover, the existing video tape and video disc formats are also capable of recording and playing back such signals without any modification.

Although the explanations given herein are in terms of the usual NTSC system used in North America and other places, using a total number of approximately 500 lines per picture, with 30 pictures per second, each picture made up of two fields with approximately 250 lines per field, we do not limit ourselves to this specfic system. Other areas of the world use different field rates and the total number of lines per field may be different. High resolution systems have been developed which use a greater number of horizontal lines. But these systems may all be adapted to the stereoscopic format described within this disclosure, by the means given herein.

Accordingly it is an object of this invention to provide an improved stereoscopic television system with a bright and flickerless display.

A further object of this invention is to provide a stereoscopic television receiver or monitor which is similar to the existing receiver or monitor apparatus with regard to substantial portions of existing electronic circuits and display devices.

Another object of this invention is to provide a television system which may be used for closed circuit applications such as on-the-job industrial applications, medical imaging during procedures, or for video assist viewfinding in conjunction with motion picture cinematography, said system providing images which are flickerless, sharp, bright and in color if so desired.

A still further object of this invention is to provide a stereoscopic television system which is highly compatible with the existing commercial television broadcast infrastructure for through the air or cable transmission.

Yet another object of this invention is to provide stereoscopic encoding using existing or future video, tape or disc formats designed to function within the existing transmission bandwidth.

Another object of this invention is to increase or double the existing field rate of the display device in order to effectively double the field rate for each eye, and to thereby eliminate flicker by raising the number of fields per eye per unit of time above the critical fusion frequency threshold.

Another object of this invention is to double the existing field rate at the CRT or similar display device in such a way as to eliminate spurious temporal parallax effects as described in copending U.S. patent application Ser. No. 263,944.

A further object of the present invention is to provide a display device suitable for three dimensional computer graphics, simulator displays, medical imaging like CAT scan, ultra sound, or stereo X-ray and for video games.

And another object of the present invention is to provide a stereoscopic television receiver or monitor which may playback conventional planar transmissions.

Still another object of the present invention is to enable multiple viewers to see different programs on a single display device. Occluding or polarizing glasses could be so adjusted to display but one of two programs.

Yet another object of the present invention is to allow for single camera operation using optics similar to those employed in the past for motion picture and still stereoscopic photography on a single frame of film.

Another object of the present invention is to allow for the use of a fiber optic convertor designed to allow existing photographic objectives to interface with a video camera to provide the necessary over-and-under images to be formed on the light sensitive surface after having been imaged through the appropriate horizontally displaced perspective points of view.

Another object of the present invention is to provide a low voltage powered source for electro-optical occluding spectacles which steps up this safe voltage to a useful higher voltage value.

A further object of the present invention is to provide relatively simple and economical means for optical projection of stereoscopic television images so that they may be viewed by large numbers of persons wearing individual selection device of passive design.

Other objects of the present invention are described herein and we do not mean to limit ourselves by those set forth above.

BRIEF DESCRIPTION OF THE DRAWINGS

FIG. 1 shows right and left image subfields as they would be displayed on a conventional unmodified video monitor, with the right subfield above and the left below, and with the subfield vertical blanking area and/or vertical sync pulse signal added between the two.

FIG. 2A shows a schematic set-up of the dual ensemble stereocamera, using an external sync generator, feeding right and left images to a display device to be viewed with the aid of an individual selection device.

FIG. 2B shows a schematic set up of the dual ensemble stereocamera using a digital effects box feeding right and left images to a display device to be viewed with the aid of an individual selection device.

FIG. 2C is a block diagram of the electronics associated with the arrangement of FIG. 2A.

FIG. 2D is the schematic of the electronics of FIG. 2C.

FIG. 3A is a schematic diagram of the sync pulse inserter used to process compatable video signals for stereoscopic display.

FIG. 3B is a schematic diagram of the sync pulse inserter shown in FIG. 3A.

FIG. 3C is a plot of the voltage as a function of time for the vertical interval produced by the sync pulse inserter shown in FIG. 3B.

FIG. 3D is a representation of the video signal input to the apparatus of FIG. 3B.

FIG. 3E is a representation of the video signal after being processed by the sync pulse insertion circuit of FIG. 3B.

FIG. 4 shows a schematic view of the apparatus needed to image the over-and-under views as shown in FIG. 1 with a single over-and-under camera lens as employed for motion picture cinematography.

FIG. 5 shows the schematic layout of a fiber optic over-and-under imaging unit enabling adaptation of conventional paired optics to produce the desired over-and-under disposition of stereopairs.

FIG. 6A is a diagrammatic view of a dual lens stereoscopic objective mounted on a television camera.

FIG. 6B shows the raster rotated through 90 degrees to be used in conjunction with the optic shown in 6A.

FIG. 6C is a schematic presentation of analog-to-digital-to-analog converter used to interface the optic and associated system shown in 6A with a normal horizontally disposed raster.

FIG. 7 is a schematic diagram of the electronics associated with the single camera technique for photographing and displaying stereoscopic video images as disclosed herein.

FIG. 8A shows a diagrammatic presentation of a video assist viewfinder as might be employed for the production of theatrical films allowing for the display of stereoscopic images in real time during photography.

FIG. 8B shows a schematic view of a conventional video camera looking at the ground glass screen as depicted in FIG. 8A.

FIG. 9A is a cross section of a video projector converted to project three-dimensional images according to the format disclosed herein.

FIG. 9B is a cross section of a specially designed projector to display three-dimensional images according to the format disclosed herein.

FIG. 10 is a schematic diagram of the electronics associated with the recentration corrector convergence setting device described herein.

FIG. 11 is a schematic diagram of the electronics system used for powering and synchronizing electro-optical spectacles using low voltage stepped up to a higher voltage at the spectacles.

FIG. 12A shows the design of a stereoscope hood to be used to view three-dimensional images with the above-below format.

FIG. 12B is a cross-sectional view of the optical elements employed in the stereoscope illustrated in FIG. 12A.

FIG. 13 is a diagrammatic representation of the skittering process wherein the raster position is altered to provide parallax information by means of a single camera and dual lens.

DETAILED DESCRIPTION OF THE DRAWINGS

This stereoscopic television system encodes right and left images which are displayed in the manner illustrated in FIG. 1 when played back on a standard receiver or monitor. The right image field 3 is shown to be above the left image field 4, but the teaching of the disclosure is in no way altered if left 4 is placed above and right 3 below. The reader will note that the fields are vertically compressed or anamorphosed by a factor of two. The blanking region 1 between fields 3 and 4 may provide sync pulse information in accordance with techniques to be discussed later.

With reference to FIG. 2A, we see the arrangement of double camera ensemble and some of the electronics associated with stereoscopic videography and viewing of the format described above and illustrated in FIG. 1. This dual camera rig uses video cameras 7 and 9 for imaging left and right stereoscopic fields with left and right objectives 6 and 8. Cameras are mounted on base 10 which may make provision for varying the interaxial separation between the cameras. External sync generator 11 and alternative subfield switch 11', synchronizes the camera subfields and can provide power for electro-optical occluding spectacles 12 which are used to view the image 13 on cathode ray tube (CRT) 14. The elements 12' and 12" of the spectacles may use any form of occluding scheme, but in all likelihood this will be electro-optical rather than mechano-optical. In some applications, such as arcade games, mechano-optical selection devices may have advantages. Although a CRT is shown as the display device throughout this disclosure, we do not limit ourselves to this means since other display techniques already in existence or under development will be usable so long as they have suitable characteristics to display and refresh at an appropriate rate on a plane surface with images of the desired characteristics, as set forth within this disclosure.

A more detailed discussion of the electronic systems involved in this camera and display setup will be given later in this disclosure in conjunction with FIG. 3A.

Since the right and left images are scanned with half the number of horizontal lines (at twice the usual rate), each image will fit into half the space vertically.

FIG. 2A illustrates an analog scheme for interlocking two video cameras to produce the desired format. The cameras must have suitable characteristics and must be accordingly modified in order to operate at twice the vertical frequency. The cameras' fields are outputed one after the other and separated by a suitable vertical blanking interval to produce the final video output suitable for viewing with display device 14.

FIG. 2C is a block diagram of the sync generator 11 and switch 11' used in the arrangement of FIG. 2A. FIG. 2D is the schematic diagram of the same sync generator 11 and switch 11'.

The left and right video cameras 7 and 9 are modified to a higher vertical scan frequency while retaining the normal horizontal rate. The sync generator 11 is built around a standard sync generator IC such as National Semiconductor MM5321N.

Crystal oscillator and divider 200 provides the clock signal to run the sync generator 201. This chip provides horizontal, vertical and composite sync to NTSC standards. The horizontal drive is buffered to the cameras by buffers 206A & 206C. The vertical drive resets the counter 202 which then counts horizontal lines to ½ lines per field. The output of counter 202 triggers one-shot 203 to output a 3H wide pulse. This pulse is "OR"ed by gate 204 with the vertical drive of 201 and buffered by 206B & 206D to the cameras. The vertical drive SETS and the output of one-shot 203 RESETS a "D" Flip-Flop 205 producing a square wave corresponding to the subfield selected. This square-wave drives analog switch 207 selecting the output of the required video camera. At summer-buffer 208 the composite sync from sync generator 201 is summed to the video from switch 207 producing composite video.

FIG. 2B on the other hand, illustrates digital means to accomplish the same end. External standard sync generator 2 interlocks cameras 7 and 9, and digital effects box 5 which compresses the images produced by cameras 7 and 9 and places them above and below each other with a suitable blanking interval interposed between the two, in accordance with the format described herein and shown in FIG. 1.

The reader will understand that Digital Video Effects boxes are manufactured by the Nippon Electric Corporation of Tokyo, Japan and others. These boxes receive in any format images and compartmentalize the image over limited areas. Therefore, images having the normal width but only one-half the normal height with vertical compression can be produced easily. It will be understood that utilizing such equipment one need only operate the existent controls to produce the effect generated here. The beneficial portion of the use of such equipment is that the image scheme here is produced without any wiring and/or internal electronic changes whatsoever. However, such equipment is very expensive.

Thus any two video cameras may be used in a dual camera stereoscopic ensemble, without electronic modification to said cameras, providing the video output of the two cameras is processed as shown in FIG. 2B using digital imaging techniques. We have used this technique to process left and right rolls of video tape, photographed by appropriate left and right cameras. Such video tapes are run on recorders in interlock, and the video signals of these recorders are processed by a digital effects box and dubbed onto a stereoscopic master tape for playback in accordance with the above and below format.

The disposition of left and right image fields disclosed herein neatly interfaces with filmmaking schemes for imaging left and right images onto a single piece of film. FIG. 4 shows a schematic view using a single video camera with an over and under optic 15 the type of which was originally designed by Bernier and is disclosed in his U.S. Pat. No. 3,531,191. The images as shown in FIG. 1 will be formed on the face-plate of the pickup tube of video camera 16. The necessary subfield blanking area and/or sync pulses can be inserted between the upper and lower images so that a three-dimensional image may be viewed in accordance with our teachings.

As an alternative to the above, we disclose with the aid of FIG. 5 a technique using a fiber optic converter to be employed in conjunction with a video camera. Pickup tube 18 has its face plate 19 in immediate and intimate juxtaposition with twin fiber optic devices 17 and 20. Images are formed by lenses 21 and 22, a matched pair of objectives. These provide the necessary two perspective points of view for a stereoscopic pair. The images are formed on the surfaces of the fiber optic bundles $17_a$ and $20_a$ and thence are carried back to face plate 19 so disposed as given earlier in this disclosure to be over and under as shown in FIG. 1. Thus, a variety of optics may be employed with a single video camera. Moreover, the images need to be anamorphically compressed in the vertical direction by a factor of two, and as is well known in the art, this type of compression has been achieved by altering the spacing of the fiber optic bundle in the desired direction of compression. Thus, the images may be appropriately disposed on the face plate of the video camera tube and their compression altered by the same fiber optic bundles.

We will now describe a stereoscopic video assist viewfinder for the professional motion picture industry. FIG. 8A and FIG. 8B illustrate the embodiment.

Video camera 23 with an objective lense 24 of conventional design 24 looks through semi-silvered mirror 25 at ground glass image 29 reflected from the motion picture camera moving mirror 26, a portion of the camera's reflex viewing system. Over and under objective 27 forms an image onto film 35 when mirror 26 is swung out of the way, or onto ground glass screen 29 for reflex viewing as formed by eye piece 30 and seen by eye 31.

Given the present state of the art, cinematographers will see two images on the ground glass screen of the finder and not a single stereoscopic image as is desirable. Therefore, a video assist three-dimensional system as described here will greatly facilitate production by allowing technicians to preview desired stereoscopic effects at the time of production, rather than during projection of dailies.

The over and under image as formed on ground glass screen 29, consisting of right and left fields 32 and 34, respectively, are photographed with video camera 23 with subfield blanking area and/or sync pulse 33 added to the signal by electronics 11 which also can synchronize the electro-optical spectacles to the field rate as displayed on the screen 13 of CRT 14.

Thus variations in the lens controls, such as convergence or interaxial setting, can be instantly viewed and evaluated on screen 13, resulting in a savings of time and money for the production crew. Viewing may be accomplished in monochrome or color, and images may be taped for study. Existing video assist cameras may be readily adapted to this technology. They already allow for planar viewing of images, and our technology would allow for three-dimensional viewing using these already commonplace instruments.

The system of viewing three-dimensional images through camera viewfinders may also be employed using two video camera photography which is accomplished with double system cameras, which are usually Ramsdell of "L" type configuration rigs. The images are then combined in accordance with that portion of this disclosure illustrated by FIG. 2A or FIG. 2B.

When the glasses are removed the left and right images are seen superimposed on each other, providing a perfect opportunity to correct for centration errors which often crop up even in well engineered dual camera rigs. In addition, convergence may be set by means of this technique.

It should also be mentioned that this technology can be used to help view film stereoscopically during the editorial process. The same sort of arrangement shown in FIG. 8B might also be employed to photograph, with a video camera, images on an editing machine screen to be viewed stereoscopically.

As we have described earlier, stereoscopic optics like those designed for motion picture work, for imaging the two perspective viewpoints over-and-under, are directly applicable to the present three-dimensional video format. However, such optics are costly and complex, because of the need to take the two horizontally displaced viewpoints and move their resultant images to relative vertical displacement. Other types of optics, less costly and complex, have been developed. One type, offered for sale by Bolex in the early fifties (described by Millet, 1952, Some Geometrical Conditions for Depth Effect in Motion Picture, Journal of the SMPTE, 59:517–23), followed a design in common use by that time. As shown in FIG. 6A twin optics 37 and 38 are placed side-by-side and obtain their necessary interaxial separation by means of reflecting surfaces 42 and 43 and 39 and 40. The optical system is less complex than over-and-under systems. Side-by-side images are formed, in our application, on faceplate 19 of pickup tube 18 of video camera 36. Thus the dual optic 41 allows a single video camera to become a source of stereoscopic information. However, the images are placed side-by-side, not over-and-under as would be in accordance with the needs of the present teaching. But the present teaching doesn't have to be limited to over-and-under imaging, since means can be provided to adapt side-by-side imaging to our needs.

If the camera raster were rotated through 90 degrees to provide the vertical orientation of picture line elements, as shown in FIG. 6B, the intersection of the two images and the blanking area used for the sync pulse would coincide. Thus the sync pulse could be added as described elsewhere in this disclosure. Next the monitor CRT must use a vertical raster in order to be compatible with the method of photography.

The vertical orientation of the raster may be obtained by a rotated camera pick up tube yolk and monitor CRT, or by physically turning the equipment on its side.

Other means may also be provided to enable us to employ side-by-side optics, as shown in FIG. 6C. Lens 41 images the stereopair side-by-side on the faceplate of camera 36 as described above and shown in FIG. 6A. Next the analog video signal from 36 is processed by analog to digital to analog converter 48 which in effect rotates the picture line elements back to horizontal alignment. Although the yolk of pickup tube 18 of camera 36 may be oriented through 90 degrees in order to produce the necessary vertical raster, the analog-digital analog unit, using well-known techniques, re-orients the raster and creates the format as shown in FIG. 1, so that it may be displayed on unmodified CRT 49 with a horizontal raster on screen 50.

Such images processed by 48 would be completely compatible with images produced by the camera ensemble illustrated in FIG. 2A. Those versed in the art will understand that howsoever images are disposed on the camera faceplate by stereoscopic optics, digital techniques may be used to produce the above and below format illustrated in FIG. 1 and described throughout this disclosure.

A purely optical solution to the problem of image orientation and alignment with the raster can also be found. Dewhurst (Introduction to 3-D, MacMillan Co., 1954) describes a number of schemes for orienting or rotating images for motion picture stereoscopy using mirror or prism systems. It is possible to produce two images side-by-side, but each of which is rotated through 90 degrees in the same direction. Such a pair of images would automatically supply the necessary image alignment with the raster so that the blanking area would lie between the images. The raster is vertically oriented to accommodate the dual images which have a vertical boundary between them. The important thing here is that optical means can be provided for rotating the two images in the same direction and through 90 degrees.

The video output of a camera with such an optic mounted can be displayed directly on a monitor which has the usual horizontal raster.

For many applications the use of relatively small CRT displays, commonly up to 26 inches in diagonal, using active glasses with elements occluding in synchronization with the alternately presented right and left fields, will provide an adequate means for several individuals to view stereoscopic television images. However, there may be occasions when it is preferable to show such images to large groups of people on larger screens. In such a case our system offers the viable option of projected video images to be viewed stereoscopically by means of passive glasses employing the technique of image selection by polarization. Such a technique, using spectacles with sheet polarizes aligned to correspond with the orientation or projection lens sheet polarizers, is well-known art and its modern form was disclosed by Land in U.S. Pat. No. 2,099,694.

First, we will describe a technique for conversion of existing video projection units to stereoscopic projection lenses each projecting an additive color primary in superimposition onto a high gain screen. For the sake of simplicity we will show but a single necessary image alignment with the raster so that the blanking area would lie between the images. The raster is vertically oriented to accommodate the dual images which have a vertical boundary between them. The important thing here is that optical means can be provided for rotating the two images in the same direction and through 90 degrees.

The video output of a camera with such an optic mounted can be displayed directly on a monitor which has the usual horizontal raster.

For many applications the use of relatively small CRT displays, commonly up to 26 inches in diagonal, using active glasses with active elements occluding in synchronization with the alternately presented right and left fields, will provide an adequate means for several individuals to view stereoscopic television images. However, there may be occasions when it is preferable to show such images to large groups of people of larger screens. In such a case our system offers the viable option of projected video images to be viewed stereoscopically by means of passive glasses employing the technique of image selection by polarization. Such a technique, using spectacles with sheet polarizes aligned to correspond with the orientation of projection lens sheet polarizers, is well-known art and its modern form was disclosed by Land in U.S. Pat. No. 2,099,694.

First, we will describe a technique for conversion of existing video projection units to stereoscopic projection lenses each projecting an additive color primary in superimposition onto a high gain screen. For the sake of simplicity we will show but a single projection lens as depicted in FIG. 9A.

Typically a small and bright CRT 52 is at the focal point of spherically curved mirror 51 and light is projected onto screen 57 after having passed through correction plate 53. We add means for super-imposing the left and right image fields and polarizing each field. This is to be accomplished by an add-on converter made up in part of sheet polarizers with axis orthogonally oriented labeled 54 and 54'. The images are sufficiently separated when they reach 54 and 54', so that they may be individually treated by the add-on optical system. It should be noted that sheet polarizers 54 and 54' may be placed after prisms 55 and 55' or after anamorphic lenses 56 and 56', and that the components shown here may well be reordered and that such a repositioning in no way alters the intention of this teaching.

Prisms 55 and 55' are chromatically corrected and of such a dioptric power to cause the top and bottom or over and under portions of the stereopair to be converged on screen 57. Anamorphic elements 56 and 56' are employed to restore the vertically compressed images as shown in FIG. 1. However, such restoration of the image to proper proportions may be accomplished electronically so that the image formed on CRT 52 needs no further restoration of shape.

FIG. 9B shows a three-dimensional projection television optical system designed to be used with the over-and-under format described herein. However, this teaching may well be used for side-by-side disposed images, or the like, and in no way does this alter the essence of the invention.

CRT 52 is at the focal points of dual mirror 60. Mirror 60 is made up of two surfaces, joined at an interface and separated by septum 59 which lies between the mirror 60 and the CRT 52, and so aligned to exactly coincide with the subfield blanking area. Its purpose is to separate optically the upper and lower portions of the stereopair. The optical centers of the two halves of mirror 60 are so adjusted to produce up and down shifts in the upper and lower images to bring them into essential coincidence on the screen as is necessary for successful stereoscopic projection. It should be noted that the two surfaces of 60 are essentially identical, and that such a mirror, usually front surfaced with metallic material, is generally the surface of a sphere, or paraboloid of revolution. Thus the individual upper and lower portions of the stereoscopic pair as shown in FIG. 1 are individually treated and brought to focus on screen 57. Sheet polarizers 54 and 54' serve the same purpose as they did when described above and as illustrated in FIG. 9A, and it will be understood by those versed in the art that they may be placed elsewhere in the optical system, such as directly on the faceplate of CRT 52.

Anamorphic elements 58 and 58' are shown in the optical system and are used to restore the image to full vertical height if so required. FIG. 1, as has been mentioned above, illustrates the possible need for cylindrical optical elements, but it is also conceivable that such shape restoration can be accomplished electronically, and it may also be unnecessary to engage in such restoration since the image may have no need of such restoration. It is also possible to design the shape of mirror 60 so that it deanamorphoses the image formed in the faceplate of CRT 52. In any event, it should be obvious that elements 58 and 58' may be left out of the system and that their inclusion or exclusion in no way alters the essential nature of this portion of our teaching.

Bonne, in U.S. Pat. No. 3,858,001, describes a method for altering the axis of polarization of an image displayed by a CRT, or similar display device, in synchronization with the field rate, so that polarizing spectacles of the type used for viewing motion picture projection might be employed. Electro-optical material is difficult to manufacture in sizes large enough to cover such a display device, but the CRT's used for projection are much smaller, making this approach more practical.

Therefore, in addition to optical superimposition of simultaneously projected above and below images, as described above, alternate fields polarized orthogonally may also be projected using electro-optical elements switching in synchronization with the field rate.

We will now devote our attention to the electronic systems of our stereoscopic television.

One basis for this invention is the use of a vertical scanning frequency of twice the normal rate. By doubling the vertical scanning rate only, it is possible to build a flickerless stereoscopic television system which preserves the standard color subcarrier frequency, the standard horizontal frequency, and the bandwidth of the NTSC system.

Stereoscopic images can be generated with either one or two camera systems. A block diagram of the two camera system 7 and 9 is shown in FIG. 2A. A sync generator 11 creates horizontal drive at the normal frequency and vertical drive at twice the vertical frequency. It supplies these signals to two suitably modified video cameras. Each camera now scans a full field consisting of ¼ the number of horizontal lines found in a standard video frame. The non-composite video of the individual cameras is selected by subfield video switch 11' at the end of each subfield with the same camera output always selected first. This non-composite video is then combined with a normal (standard vertical and horizontal rates) sync signal to create a compatable composite video signal. The resultant signal is shown in FIG. 3D. The result image as seen on a unmodified monitor is shown in FIG. 1.

One significant improvement over previous video systems is that the order of the subfields (left-right or right-left) is always the same within all fields eliminating any possible loss of synchronization and phase with the viewer's occluding device. Hence, it is not possible to mistakenly produce a pseudoscopic image.

The display system of FIG. 2A utilizes a monitor 14 modified for a higher vertical rate. The incoming compatible signal as shown in FIG. 3D is processed by the sync pulse insertion circuit such as is shown in FIG. 3B. This signal drives the monitor to sequentially display two fully interlaced pairs of subfields in the time of two standard fields. The same circuit also provides the signal of FIG. 2A to synchronize and phase the occluding glasses 12.

Thus, our stereoscopic television system utilizes a unique synchronization system in order to eliminate flicker with a minimal reduction of vertical resolution. The synchronization system offers only a small departure from the NTSC video signal standards, allowing the video to pass through the existing television infrastructure with only minor processing.

The video signal used in our stereoscopic television system is the same as defined by EIA proposed standard RS-170A with the following exception: As shown in FIG. 3C, each of the two fields, marked Field 1 and Field 2, in the RS-170A system are subdivided into two subfields, giving a total of four subfields, subfields 1 and 2 forming field 1, and subfields 3 and 4 forming field 2. Each pair of subfields are separated by a vertical interval identical to the interval presently used in the RS-170A system. The two additional vertical intervals are positioned relative to the two original vertical intervals causing interlace of subfields 1 and 3, and interlace of subfields 2 and 4. It is noted that this system will work without any added sync pulses, but with some loss of vertical resolution. We in no way limit ourselves to this particular scheme and the essential nature of this disclosure is in no way altered by using other methods of interlace.

The sync pulse inserter circuit 65 as shown in FIG. 3A operates as follows. The incoming video goes to sync separator 100 and the horizontal and vertical sync signals are detected and standardized by one-shots 97 and 98. The horizontal sync is multiplied by 4 in phase lock loop 103 and counter 108 producing a 4H signal. The 4H signal is divided by approximately 512 in counter 105. This counter is reset by the vertical sync from the one-shot 97 outputing a square wave exactly a field in duration and high for one subfield and low for the other subfield. The first transition of this square wave after the vertical sync triggers one-shot 106 to output a pulse about 3H wide.

This pulse switches analog gate 104 between the incoming video buffered by buffer 101 and a DC voltage from sample and hold circuit 102 that is exactly equal to the sync tip of video. This creates a vertical sync pulse exactly in the center of the field to lock the vertical oscillator in the monitor. The resultant video is buffered by 107 to match 75 ohms.

This circuit 65 could be either in each monitor or receiver or centrally located within a facility.

With the single camera method, the electronics of which are schematized in FIG. 7, the left and right images are formed by a Bernier-type optical device 67 in front of the camera. The images are formed on the pickup tube face plate in such a way, shown in FIG. 1, that one image is scanned during the first half of the camera vertical field and the second image during the second half of the vertical field. The video next passes through the vertical sub-field sync pulse inserter 65, giving it a 120 Hz vertical rate and then to the 120 Hz monitor 66 and occluding glasses 12.

It is important to note that the camera vertical sweep does not have to conform with the true vertical axis. With some optical devices, it might be worthwhile to interchange vertical and horizontal axis on both the camera and monitor as shown in FIG. 6A and FIG. 6C and described earlier.

We will now discuss a method for performing convergence or correcting recentration with this stereoscopic system, as shown in FIG. 10. Some aspects of convergence and centration control are described in copending application Ser. No. 263,944. At the output of the camera for the single camera system or the output of the alternate field switch on the two camera system, the composite video and sync signal is split into two paths again. In one path there is a fixed delay of 67 of about two video lines. In the other path there is a variable delay 68 of zero to 4 lines. The two paths are then recombined by a video switch 69. The video switch 69 is driven in such a way that it will pass all sync pulses plus one camera's video signal from the fixed delay path 67 and the other camera's video signal only from the other delay path. If the cameras were perfectly converged, the variable delay 68 would be set to be equal to the fixed delay 67 so the left, right, and sync signals arrive in coincidence with each other. To correct for convergence or recentration errors, as described in copending patent application Ser. No. 261,302, filed May 15, 1981, entitled Stereoscopic Zoom Lens System for Three Dimensional Motion Pictures and Television, the variable delay line 68 is changed on the order of microseconds to correct for horizontal errors and on the order of lines for vertical errors. The net effect would be a horizontal or vertical picture shift of the left image in relation to the right. This system would not change any of the sync pulse relationships and thus would allow the processed video to pass through the television infrastructure. An alternate correction scheme, would use only one variable delay line on one video path and no delay on the other. In this scheme the video switch would determine whether left or right video was delayed. In any case, sync would not be delayed.

A second method for convergence or recentration control would be to delay or advance the horizontal and/or vertical sync signals fed to one camera with respect to the other. This system would be inexpensive to implement, but would have the drawback of producing a video signal with non-standard sync signals. Even if such a signal were routed through a time base corrector the results would be unpredictable.

We will now discuss a safe and practical means of powering PLZT occluding spectacles. Prior art has advocated the use of PLZT occluding spectacles in the field of television stereoscopy, but little reference has been made to the safety and aesthetic problems these devices present. State of the art PLZT elements require from 200 to 700 volts in order to operate.

Our spectacle system as diagramed in FIG. 11 would eliminate the safety problem with the use of low potential wiring, a step-up transformer 71 and a diode-resistor network 72. A switching power source 70, which could be battery powered and carried on one's person, outputs a low potential square wave in synchronization with the television field rate. The square wave travels on an insulated 3 conductor cable to the spectacles 12. Mounted on the spectacles is a small step-up transformer 71. This transformer 71 would raise the voltage to the levels required to operate the PLZT elements 12' and 12". The high voltage would pass through a dioderesistor network 72. This would steer one-half of the square wave's power to one element 12' and the other half to the other element 12". The entire transformer 71, resistor-diode 72, and PLZT 12' and 12" element assembly could be sealed with a high dielectric constant substance to provide user safety. If the integrity of this potted assembly was violated, the circuit within would be broken and power interrupted.

An alternative for powering the glasses employs a fiber optic cable, transmitting a light source which flashes in synchronization with the subfield rate, to a photocell or phototransistor mounted in the spectacle frames. The photocell or phototransistor then converts light pulses into electrical pulses which are then boosted in voltage to power the electro-optical switching elements.

Another technique we believe to be a useful contribution to the art we have named skittering, and this is diagrammatically illustrated in FIG. 13. Shown are image forming tube 76, with face-plate 77, and aperture mask 78. The geometric center of the area of the faceplate 77 circumscribed by aperture mask 78 is marked by cross hairs 79. Horizontally displaced, and equidistance from 79, are new raster centers 79' and 79". Usually the center of the raster corresponds exactly to 79. By electronic means we recenter the raster to positions on the faceplate 77 given by 79' and 79". It is important to state that no vertical displacement of the center is to take place, but only left and right horizontal translations to displace the raster so that it will have new centers at 79' and 79".

Although the description given here is in terms of analog techniques, using a CRT pickup tube, digital pickup type devices may also be skittered, as will be understood by those versed in the art, and we do not wish to limit ourselves to analog applications.

Shown also are lenses 81 and 81' with their optical centers 80 and 80', with lens axis 82 and 82', respectively. In usual practice with a single lens, the axis corresponds to a perpendicular dropped from the single lens center intersecting the plane of the faceplate 77 at its center 79.

Since the center of the image area has been electronically relocated by shifting the raster so that new centers of the image alternately correspond to point 79' and 79", the new effective axis located on lines 82 and 82' are perpendicular to the plane of faceplate 77, intersecting 79' and 79" respectively. Skittering of the center of the raster to 79' and 79" respectively occurs at subfield rate, and said shifting will be accompanied by a change in the optical perspective of the image, first through 81, then through 81'. Such a shift will be on the order of several millimeters.

Thus, two perspective points of view, one through lens 81 and the other through 81', skittered at subfield rate, can be imaged with a single camera and pickup tube or digital imaging device. Skittering then provides a stereoscopic source, as shown here, primarily for closeups or extreme macro photography of objects up to several tens of millimeters across, since the effective interaxial separation, corresponding to the distance between optical centers 80 and 80' is relatively low.

For simplicity we have omitted the reflecting separations, as shown in FIG. 6A and described elsewhere in this disclosure.

Side-by-side optics, of the Bolex type shown here and in FIG. 6A, or frame splitters, which use mirror arrangements similar to the Wheatstone stereoscope, for imaging left and right fields side-by-side on the same format, are far simpler and less costly to design and build than the Bernier-type over and under optics. Moreover, side-by-side optics may be manufactured to have greater light transmittance than over and under optics, and it is easy to provide interchangeable prism assemblies for various interaxial separations for side-by-side optics while it is difficult to accomplish this with over and under designs.

Therefore, there are advantages to using side-by-side optics or frame dividers in conjunction with skittering since this process electronically translates the side-by-side format into the over and under format in accordance with the system described herein.

Said skittered stereoscopic signal is entirely compatible with the over and under 120 Hz format we have designed and built. The camera employed for skittering must be adjusted to a 120 subfields per second rate, with the subfield blanking area and/or sync pulses added between the left and right subfields. Such video output would produce a format, which when displayed on an unmodified monitor would be identical to the format shown in FIG. 1, and which would in all ways conform to the signal requirements for stereoscopic transmission set forth herein.

Those skilled in the art will appreciate that while we have described our system in terms of switching at field rate, switching at horizontal line rate is also possible. Although the preferred embodiment described here is a 120 Hz system using field switching, a 60 Hz system using alternate horizontal line switching is useful in connection with dual optical variations using single cameras and skittering.

For certain applications it may be desirable to display our three-dimensional video signals on an electronically unmodified monitor, receiving an above-below signal. With reference to FIG. 12A, we show a stereoscope hood attachment 70 to be added onto the receiver or monitor, by placing said stereoscope hood in intimate juxtaposition with the faceplate of CRT 70'. The format shown is in accordance with FIG. 1 with above image 3 right, and below image 4 left, with blanking area 1 with added sync pulse signal. The hood is essentially hollow and made of any lightweight opaque material. The hood is a housing for sheet polarizers 68 and 69 which are laid over right and left above and below images respectively. The polarizers have axes of polarization orthogonally oriented as shown by the arrows.

The faceplate 75 of the hood contains optical systems designed to act as a septum to segregate right and left images, to refract light from above and below images so that they may be viewed comfortably with the eye muscles functioning as usual, to deanamorphose the above and below vertically compressed images, and if necessary, to provide convex lenses to aid in accommodation of the images.

With reference to FIGS. 12A and 12B, we will examine components of the optical system at the faceplate. FIG. 12B is a cross-section of the left elements of the system, and is functionally identical to the right elements, which are identified with the prime superscript.

Sheet polarizers 71 and 71' have their axis of polarization oriented orthogonally. The axis of 71 is oriented parallel with left below image 69 and the axis of 71' is oriented parallel with right above image 68. Prism 72 refracts or bends rays from image 69 so that the axis of the left eye lens and the axis of the right eye lens will lie in the same horizontal or median plane, as is usual for normal vision. Prism 72' performs a similar function for the right eye.

The reader will note that elements of the optical system are housed in mounts identified in FIG. 12B as part 76 for the left eye.

Cylindrical elements 73 and 73' deanamorphose images 68 and 69 respectively and thereby restore them to images with normal shape and aspect ratio.

Elements 74 and 74' are needed only if the distance from the faceplate of the hood 70 to the faceplate of CRT 70' is short enough to require said elements for the purpose of aiding accommodation.

It should be called to the attention of the reader that sheet polarizers 68 and 69, and 71 and 71' do not function in the same manner as polarizers employed for image selection for projection of stereoscopic images. Rather they take the place of the septum usually found in stereoscopes and provide an optical rather than a physical means for segregation of the left and right images.

The reader will also be aware that the order of individual elements mounted in 76 may be varied, and that for purposes of superior correction additional elements may be added which in no way would make any substantive change to the design disclosed herein.

And further, the reader will be aware that this stereoscope design will work in conjunction with any film or TV over-and-under format, and could be used, for example, for viewing motion pictures on an editing machine viewing screen.

Several approaches are possible when transferring stereoscopic film to tape for video transmission. The approaches vary with the type of system used for the original photography, or for the format of the master to be used when dubbing to tape. We have transferred double system stereoscopic film by transferring left and right rolls to left and right tapes. The telecine must guarantee synchronization of the film frame rate with the TV field rate, so that the total number of video fields produced for the right tape will be the same as the total number of fields produced for the left tape.

In addition, there must be a correspondence between the starting frames for left and right film rolls and the odd or evenness of the video fields. In the usual conversion of film to tape for NTSC video, 24 frames per second of picture must become 60 video fields. Each successive frame is thus transferred to two fields and thence three fields, thereby producing a total of sixty fields per second from 24 frames of film picture.

Next the tapes containing the right and left pictures are run in interlock and their video signals passed through a digital effects box and manipulated to conform to the above-below format described in this disclosure. The video output of the digital effects box is then recorded.

When transferring to video from single system stereoscopic motion pictures, a single pass may be employed to produce the necessary above and below format. This is straightforward for the case of above and below stereoscopic films, photographed in accordance with designs by Bernier, U.S. Pat. No. 3,531,191, and in accordance with other practitioners of the art. The subfield blanking area and/or sync pulse must be added between the above and below frames in order for complete compatibility to be insured for the system described herein.

We will conclude this disclosure by mentioning that our system has many virtues, not the least of which is its unique electronic-optical interface, which presents many design advantages. Prior art stereoscopic systems, such as those put into practice by Butterfield and others, employ stereopairs of images disposed side-by-side and adjacent to each other on the screen of a CRT. Such images may be optically projected using dual projection optics similar to those used for motion picture projection, or such images may be viewed by means of a stereoscope hood placed in close proximity with the display.

Such means are also possible to achieve with our system since it can readily display the images on a CRT or similar display device in a manner similar to that described above. In addition, our technique allows for display by means of active glasses using electro-optical occluding elements, which heretofore has been beyond the means of prior art techniques using adjacently disposed right and left images.

Thus, the optical-electronic interface built into the system allows images from the same program source to be viewed through a stereoscope-type device, or by means of optical projection and viewing through passive spectacles, or for display using alternate fields of right-left information to be viewed by means of active spectacles. Moreover, the system encourages interfacing motion picture and electronic uses since motion pictures may be readily converted to our video format, especially those which have been photographed on a modern over-and-under system.

Another feature of the above-below encoding of stereoscopic video information, with regard to computer graphics, is that programming of such images in video memory is much simpler and easier to implement using software with current computer video hardware than the alternative of encoding successive fields with right-left information. This is true because the above-below format does not care about field memory, but only cares about total image memory, and current hardware is much more suited to above-below encoding than encoding different images in even and odd fields because many computers simply double each field to achieve NTSC compatibility.

We have also devised means of transferring to video double system motion pictures. High quality motion pictures may also originate in our video format and may be transferred from video to motion picture film using well known art. Such video system means for film display has many virtues, not the least of which is the inherent flexibility of a double camera ensemble which can automatically record both parts of the stereopair onto a single tape. Motion picture systems seeking to exploit the virtues of double camera rigs must result in photography which is made up of two reels of film. Therefore, our system combines the best aspects of double camera rigs and those of single camera rigs. High speed optics are readily available, it is easy to vary the interaxial separation, and zooms may be achieved. All of the aforementioned are technically impossible or very difficult to achieve with over-and-under optics which are used for the photography of theatrical motion pictures.

Likewise it is obvious to those versed in the art that by analogy with the preferred embodiment of this invention, the left and right eye image pairs may be presented without flicker by doubling the horizontal sweep (double horizontal sync pulses) as well as halving the horizontal resolution. A normal CRT would then display the two images side by side but squeezed anamorphically in the horizontal direction. A receiver modified by analogous means to those described in the present invention would display the unsqueezed images sequentially mutatis mutandis. This system would also be suitable for viewing with a stereoscopic hood for video projector, and would interface in a straightforward way with such stereoscopic optics as those described by Jacobsen U.S. Pat. No. 3,433,561.

We claim:

1. A television system having means for providing standard video fields of standard duration but with each field comprising a first subfield in its upper half with the image therein vertically compressed and a second subfield in its lower half with the image therein vertically compressed, said first and second subfields being separated by a blanking area including a vertical sync pulse.

2. A television system as in claim 1 wherein each pair of video subfields comprises a stereoscopic pair of images.

3. A television system as in claim 1 wherein said upper subfield comprises the left side of a stereoscopic image pair and said lower subfield comprises the right side of the stereoscopic image pair.

4. A television system as in claim 1 wherein said upper subfield comprises the right side of a stereoscopic image pair and said lower subfield comprises the left side of the stereoscopic image pair.

5. A television system as in claim 1 including means for vertically compressing each subfield by a factor of two.

6. A television system having means for providing standard video fields of standard duration equal to (1/vertical deflection frequency) but with each field comprising a first vertically compressed subfield in its upper half and a second vertically compressed subfield in its lower half, said first and second subfields being separated by a vertical sync pulse.

7. A television system as in claim 6 wherein said subfields are additionally separated by a blanking area.

8. A television system as in claim 6 wherein each pair of video subfields comprises a stereoscopic pair of images.

9. A television system as in claim 6 wherein said upper subfield comprises the left side of a stereoscopic image pair and said lower subfield comprises the right side of the stereoscopic image pair.

10. A television system as in claim 6 wherein said upper subfield comprises the right side of a stereoscopic image pair and said lower subfield comprises the left side of the stereoscopic image pair.

11. A television system as in claim 6 including means for vertically compressing each subfield by a factor of two.

12. A stereoscopic television system for providing standard video frames, each frame having a pair of interlaced fields, of 1/60th a second each, comprising: means for providing a pair of vertically compressed stereoscopic subfields within each field, one subfield being provided by approximately the first half of the raster scan lines and the second subfield being provided by approximately the second half of the raster scan lines, successive pairs of first subfields interlaced to form video frames constituting the first of a stereo pair, successive pairs of second subfields interlaced to form video frames constituting the second of a stereo pair; and wherein each of said subfields is separated by a vertical sync pulse.

13. A stereoscopic television system as in claim 12 wherein each of said subfields is separated by a blanking area.

14. A stereoscopic television system as in claim 12 wherein each of said subfields is separated by a blanking area and a vertical sync pulse.

15. A stereoscopic television system as in claim 12 including means for vertically compressing each subfield by a factor of two.

16. A stereoscopic television system for providing video fields of standard time duration with one vertically compressed stereoscopic image forming a first subfield within the upper half of each field and the other vertically compressed stereoscopic image forming a second subfield within the lower half of each field, the subfields being separated by a blanking area and vertical sync pulse, comprising:

a first video camera for creating one of the two vertically compressed stereoscopic images for the first subfield, said first camera having means for operating at twice the normal vertical frequency rate;

a second video camera for creating the other of the two vertically compressed stereoscopic images for the second subfield, said second camera having means for operating at twice the normal vertical frequency rate;

means for switching between each of said cameras after each subfield; and means for providing a blanking area and vertical sync pulse between subfields.

17. A stereoscopic television generation system for providing video fields each having a period defined as (1/vertical frequency rate) with one stereoscopic image forming a first vertically compressed subfield within the upper half of each field and the other stereoscopic image forming a second vertically compressed subfield within the lower helf of each field, the subfields being separated by a blanking area and/or vertical sync pulse, comprising:

a first video source for creating one of the two vertically compressed stereoscopic images for the first subfield, said first video source having means for operating at twice the normal vertical frequency rate;

a second video source for creating the other of the two vertically compressed stereoscopic images for the second subfield, said video source having means for operating at twice the normal frequency rate;

means for switching between each of said video sources after each subfield; and means for providing a blanking area and/or vertical sync pulse between subfields.

18. A stereoscopic television generation system for providing standard video fields of standard duration but with one stereoscopic image forming a vertically compressed first subfield within the upper half of each field and the other stereoscopic image forming a second vertically compressed subfield within the lower half of each field, the subfields being separated by a blanking area and/or vertical sync pulse, comprising:

a first video source for providing one of the two stereoscopic images for the first subfield;

a second video source for providing the other of the two stereoscopic images for the second subfield;

means for switching between each of said video sources after each subfield;

means for providing a blanking area and/or vertical sync pulse between subfields; and means for vertically compressing each subfield by a factor of two.

19. The stereoscopic television generation system of claim 18 wherein said compressing means comprises a digital effects device.

20. The stereoscopic television generation system of claim 18 wherein said first and second video sources each comprises a video camera.

21. A stereoscopic television system for providing video fields of standard duration but with one stereoscopic image forming a first subfield within the upper half of each field and the other stereoscopic image forming a second subfield within the lower half of each field, the subfields being separated by a blanking area and/or vertical sync pulse, comprising:

a television raster scan imaging device;

means for alternately providing the first of a pair of vertically compressed video images on one-half of said television imaging device and the second of a pair of vertically compressed video images on the other half of said television imaging device;

means for centering the television imaging device raster on the first video image when it is provided and for centering the raster on the second video image when it is provided, whereby the resulting output from said image device is alternating video subfields of said first and second vertically compressed images; and wherein the vertical raster scan rate of said television imaging device is twice that of a standard television imaging device.

22. A stereoscopic television generation system as in claim 21 including means for adding a blanking area and/or vertical sync pulse between the respective subfields.

23. A stereoscopic television generation system as in claim 21 wherein said television imaging device is a television pick-up tube.

24. A stereoscopic television system for providing video fields of standard duration with one stereoscopic image forming a first vertically compressed subfield within the upper half of each field and the other stereoscopic image forming a second subfield within the lower half of each field, comprising:

an unmodified television raster scan imaging device;

an optical system for taking stereoscopic pairs of images through side-by-side left and right lenses and including means for converting the side-by-side images to over-and-under vertically compressed subfield images for delivery to said imaging device; and means for inserting a blanking area vertically compressed and sync pulse between the over-and-under vertically compressed subfield images.

25. A stereoscopic television system as in claim 24 wherein said optical system comprises an over and under lens system.

26. A stereoscopic television system as in claim 24 wherein said optical system comprises a optical fiber delivery system.

27. A stereoscopic television system as in claim 26 wherein said optical fiber delivery system comprises a first optical fiber bundle connected from one of the side-by-side lenses to the upper half of said television imaging device and a second optical fiber bundle connected from the other side-by-side lens to the lower half of the said television imaging device.

28. A stereoscopic television generation system as in claim 27 wherein the images through said first and second optical fiber bundles are anamorphically compressed in the vertical direction by a factor of two by altering the spacing of the optical fiber bundles.

29. A stereoscopic television system for providing video fields of standard duration, but with one stereoscopic image forming a first subfield compressed vertically within the upper half of each field and the other stereoscopic image forming a second subfield within the lower half of each field, comprising:

a programmed digital computer for generating the respective vertically compressed images forming said first and second subfields, said subfields being anamorphosed in the vertical direction; and means for inserting a blanking area/vertical sync pulse between said subfields.

30. A stereoscopic television display system for displaying incoming video fields of standard duration, with each field having one stereoscopic image forming a first vertically compressed subfield within the upper half of each field and the other stereoscopic image forming a second vertically compressed subfield within the lower half of each field, the subfields being separated by a blanking area and vertical sync pulse, comprising means for doubling the normal vertical sync rate of said display system so that the vertically compressed subfields appear as individual, normal sized uncompressed fields.

31. A stereoscopic television display system for displaying incoming video fields of standard duration, but with each such field having one stereoscopic image forming an anamorphosed first subfield within the upper half of each field and the other stereoscopic image forming an anamorphosed second subfield within the lower half of each field, the subfields being separated by a blanking area and/or vertical sync pulse, comprising: optical means for preventing one eye of the viewer from seeing the upper displayed subfield and preventing the other eye from seeing the lower displayed subfield; said optical means including means to deanamorphose each displayed subfield.

32. A stereoscopic television display system as in claim 31 wherein said television display system includes a cathode ray tube display and said optical means comprises:

(a) a first polarizer placed on said cathode ray tube display over the area of the displayed upper subfield;

(b) a second polarizer placed on said cathode ray tube display over the area of the displayed lower subfield, the axes of polarization of said first and second polarizers being generally orthogonal to each other; and (c) side-by-side binocular viewing elements, one viewing element containing a third polarizer having an axis of polarization generally parallel to that of said first polarizer, and the other viewing element containing a fourth polarizer having an axis of polarization generally parallel to that of said second sheet polarizer.

33. A stereoscopic television display system as in claim 31 wherein said deanamorphose means comprises a cylindrical lense.

34. A stereoscopic television display system as in claim 32 wherein each of said viewing elements includes a prism to align the axes of the respective subfield images.

35. A stereoscopic television projection display system for displaying incoming video fields of standard duration with one stereoscopic image forming a first anamorphosed subfield within one half of each field and the other stereoscopic image forming a second anamorphosed subfield within the other half of each field, the subfields being separated by a blanking area and/or vertical sync pulse, comprising:

a plurality of raster scan projectors for projecting primary color images in superimposition onto a screen;

means for optically isolating the two projected subfields from each of said raster scan projectors;

means for polarizing the respective subfield images with polarizers whose axes of polarization are orthogonally oriented;

means for superimposing the respective projected polarized subfields onto a screen with the proper stereoscopic parallax; and means associated with each of the plurality of raster scan projectors to deanamorphose the respective subfield pairs.

36. A stereoscopic television projection display system as in claim 35 wherein said isolating means comprises means for locating each of said polarizing means and each of said superimposing means at a sufficient distance from said projectors.

37. A stereoscopic television projection display system as in claim 35 wherein said isolating means comprises a double curved reflector with the interface of the two reflectors being aligned to coincide with the projected blanking area and/or vertical subfield.

38. A stereoscopic television projection display system as in claim 35 wherein said first and second subfields are arranged in an over-and-under format.

39. A stereoscopic video assist viewfinder for a stereoscopic movie camera comprising:

a conventional stereoscopic movie camera with over and under stereoscopic lenses;

means for diverting the over-and-under image from the camera film to a viewing screen;

a television monitor;

a video camera for transmitting the over-and-under image on said viewing screen to said television monitor in the form of over-and-under subfields within a single field of standard duration;

means for inserting a blanking area and video sync pulse between the resulting over-and-under subfields; and means for enabling a viewer to stereoscopically view the images displayed on said monitor.

40. A viewfinder as in claim 39 wherein said enabling means comprises means for operating said monitor at twice the normal vertical sync rate, and occluding means synchronized with the fields on said monitor to alternately block the viewer's left and right eyes.

41. A television system having means for providing standard video fields of standard duration but with each field comprising a first vertically compressed subfield in one-half of a standard field and a second vertically compressed subfield in the other half of a standard field, said first and second subfields being separated by a blanking area and vertical sync pulse.

42. A television transmission system as in claim 41 wherein said first subfield is provided in the left side and the second subfield in the right side of the standard video field.

* * * * *

UNITED STATES PATENT AND TRADEMARK OFFICE
CERTIFICATE OF CORRECTION

PATENT NO. : 4,523,226
DATED : June 11, 1986
INVENTOR(S) : LENNY LIPTON, MICHAEL STARKS AND JAMES D. STEWART It is certified that error appears in the above—identified patent and that said Letters Patent is hereby corrected as shown below:

Title page:
"By deleting Lawrence D. Meyer

[75] as a co-inventor."

Signed and Sealed this

Twenty-third Day of September 1986

[SEAL]

Attest:

DONALD J. QUIGG

Attesting Officer

Commissioner of Patents and Trademarks